(12) United States Patent
Lin

(10) Patent No.: US 8,513,543 B1
(45) Date of Patent: Aug. 20, 2013

(54) WATER-PROOFING CABLE CONNECTOR

(75) Inventor: Cheng-Hsing Lin, New Taipei (TW)

(73) Assignee: Asia Tai Technology Co., Ltd., Negara (BN)

( * ) Notice: Subject to any disclaimer, the term of this patent is extended or adjusted under 35 U.S.C. 154(b) by 0 days.

(21) Appl. No.: 13/401,011

(22) Filed: Feb. 21, 2012

(51) Int. Cl.
    *H02G 3/18* (2006.01)
(52) U.S. Cl.
    USPC ............................................ 174/656
(58) Field of Classification Search
    USPC .............. 174/650–654, 656–658, 72 R, 72 A, 174/77 R, 564
    See application file for complete search history.

(56) References Cited

U.S. PATENT DOCUMENTS

| | | | | |
|---|---|---|---|---|
| 2,195,933 A * | 4/1940 | Marlborough et al. | ...... | 174/21 R |
| 2,962,542 A * | 11/1960 | Witt | ................ | 174/76 |
| 3,187,088 A * | 6/1965 | Warner | ............ | 174/91 |
| 3,424,853 A * | 1/1969 | Johnson | .......... | 174/359 |
| 3,852,516 A * | 12/1974 | Vander Ploog et al. | ...... | 174/71 R |
| 4,015,329 A * | 4/1977 | Hutchison | ........ | 29/858 |
| 4,152,538 A * | 5/1979 | Gassinger et al. | ........ | 174/19 |
| 4,301,325 A * | 11/1981 | Hutchison | ......... | 174/76 |
| 4,311,871 A * | 1/1982 | Brunner et al. | ......... | 174/74 A |
| 4,323,727 A * | 4/1982 | Berg | ................ | 174/135 |
| 4,515,991 A * | 5/1985 | Hutchison | ........ | 174/654 |
| 4,590,329 A * | 5/1986 | Potochnik et al. | ........ | 174/88 R |
| 4,629,825 A * | 12/1986 | Lackinger | ........ | 174/654 |
| 4,692,561 A * | 9/1987 | Nattel | ........ | 174/655 |
| 4,692,562 A * | 9/1987 | Nattel | ........ | 174/655 |
| 4,692,563 A * | 9/1987 | Lackinger | ........ | 174/654 |
| 4,723,054 A * | 2/1988 | Billet | ........ | 174/74 R |
| 4,755,241 A * | 7/1988 | Steinberg | ........ | 156/48 |
| 5,015,804 A * | 5/1991 | Nattel et al. | ........ | 174/667 |
| 5,068,494 A * | 11/1991 | Bolante | ........ | 174/654 |
| 5,087,795 A * | 2/1992 | Guginsky | ........ | 174/653 |
| 5,149,916 A * | 9/1992 | Baker et al. | ........ | 174/74 R |
| 5,183,966 A * | 2/1993 | Hurtado et al. | ........ | 174/20 |
| 5,185,840 A * | 2/1993 | Iapicco | ........ | 385/100 |
| 5,266,742 A * | 11/1993 | Heier et al. | ........ | 174/93 |
| 5,281,763 A * | 1/1994 | Hey et al. | ........ | 174/84 R |
| 5,288,947 A * | 2/1994 | Stewing | ........ | 174/92 |
| 5,310,963 A * | 5/1994 | Kennelly | ........ | 174/667 |
| 5,321,205 A * | 6/1994 | Bawa et al. | ........ | 174/655 |
| 5,336,850 A * | 8/1994 | Mitsch | ........ | 174/653 |
| 5,403,977 A * | 4/1995 | Steptoe et al. | ........ | 174/77 R |
| 5,532,436 A * | 7/1996 | Moyers et al. | ........ | 174/151 |
| 5,621,191 A * | 4/1997 | Norris et al. | ........ | 174/653 |
| 5,691,505 A * | 11/1997 | Norris | ........ | 174/51 |
| 5,714,715 A * | 2/1998 | Sundhararajan et al. | ........ | 174/20 |
| 5,866,853 A * | 2/1999 | Sheehan | ........ | 174/653 |
| 5,920,035 A * | 7/1999 | Haney et al. | ........ | 174/652 |
| 6,034,325 A * | 3/2000 | Nattel et al. | ........ | 174/59 |

(Continued)

*Primary Examiner* — Ross Gushi
(74) *Attorney, Agent, or Firm* — Rosenberg, Klein & Lee

(57) ABSTRACT

A cable connector has a hollow housing, an input cap, an output cap, a wire separating base, a cable sealing assembly and a wire sealing assembly. The hollow housing has an input end and an output end. The input cap is mounted on the input end of the housing. The output cap is mounted on the output end of the housing so as to define a sealed space between the housing, the input cap and the output cap to hold the wire separating base, the cable sealing assembly and the wire sealing assembly inside. The wire separating base is mounted in the housing and has a first end and a second end. The cable sealing assembly is connected to the first end of the wire separating base. The wire sealing assembly is connected to the second end of the wire separating base.

11 Claims, 5 Drawing Sheets

(56) References Cited

U.S. PATENT DOCUMENTS

| | | | | |
|---|---|---|---|---|
| 6,045,403 A * | 4/2000 | Werner et al. | ................ | 439/587 |
| 6,268,565 B1 * | 7/2001 | Daoud | ................ | 174/657 |
| 6,274,816 B1 * | 8/2001 | Kendall, Jr. | ................ | 174/84 R |
| 6,488,318 B1 * | 12/2002 | Shim | ................ | 285/322 |
| 6,812,406 B2 * | 11/2004 | Hand | ................ | 174/667 |
| 7,115,822 B1 * | 10/2006 | Day et al. | ................ | 174/662 |
| 7,288,719 B2 * | 10/2007 | Barnhard et al. | ................ | 174/77 R |
| 7,521,634 B2 * | 4/2009 | Clem et al. | ................ | 174/113 R |
| 7,604,261 B2 * | 10/2009 | Kiely | ................ | 285/248 |
| 7,633,011 B2 * | 12/2009 | Bolante | ................ | 174/84 R |
| 7,635,813 B2 * | 12/2009 | Taylor et al. | ................ | 174/74 R |
| 7,735,876 B2 * | 6/2010 | Chiu | ................ | 285/207 |
| 7,824,213 B1 * | 11/2010 | Korcz et al. | ................ | 439/552 |
| 7,900,970 B2 * | 3/2011 | Chiu | ................ | 285/207 |
| 7,900,971 B2 * | 3/2011 | Chiu | ................ | 285/207 |
| 7,973,241 B2 * | 7/2011 | Evoniuk et al. | ................ | 174/84 R |
| 8,324,502 B2 * | 12/2012 | Kameda et al. | ................ | 174/77 R |

\* cited by examiner

WATER-PROOFING CABLE CONNECTOR

BACKGROUND OF THE INVENTION

1. Field of the Invention

The present invention relates to a cable connector, and more particularly to a water-proofing cable connector that can separate a cable into multiple branch wires.

2. Description of Related Art

A cable or optical fiber is used to transmit electrical power or communication signal. To connect the cable or the optical fiber to an electrical power machine or a communication machine, the cable or the optical fiber has to be separated into multiple wires, and the wires have to be positioned and sealed to keep water and moisture enters into the cable or the optical fiber.

However, to position and seal the separated branch wires of the cable or the optical fiber is difficult and laborious. A conventional connector is applied to position the separated branch wires, but the sealing effect of the conventional connector is not sufficient. A water-proofing connector is also applied to provide a better water proofing effect, but the conventional water-proofing connector has a large volume and is time-consuming in assembling. The water-proofing element of the conventional water-proofing connector is exposed to the outer environment and is easily damaged.

To overcome the shortcomings, the present invention tends to provide a water-proofing cable connector to mitigate or obviate the aforementioned problems.

SUMMARY OF THE INVENTION

The main objective of the invention is to provide a cable connector to provide an excellent sealing and water proofing effect to a cable and branch wires of the cable.

The cable connector has a hollow housing, an input cap, an output cap, a wire separating base, a cable sealing assembly and a wire sealing assembly. The hollow housing has an input end and an output end. The input cap is mounted on the input end of the housing. The output cap is mounted on the output end of the housing so as to define a sealed space between the housing, the input cap and the output cap. The wire separating base is mounted in the housing and has a first end corresponding to the input end of the housing and a second end corresponding to the output end of the housing. The cable sealing assembly is connected to the first end of the wire separating base. The wire sealing assembly is connected to the second end of the wire separating base. The wire separating base, the cable sealing assembly and the wire sealing assembly are mounted in the sealed space between the housing, the input cap and the output cap.

Other objects, advantages and novel features of the invention will become more apparent from the following detailed description when taken in conjunction with the accompanying drawings.

DETAILED DESCRIPTION OF PREFERRED EMBODIMENT

Figure 1:
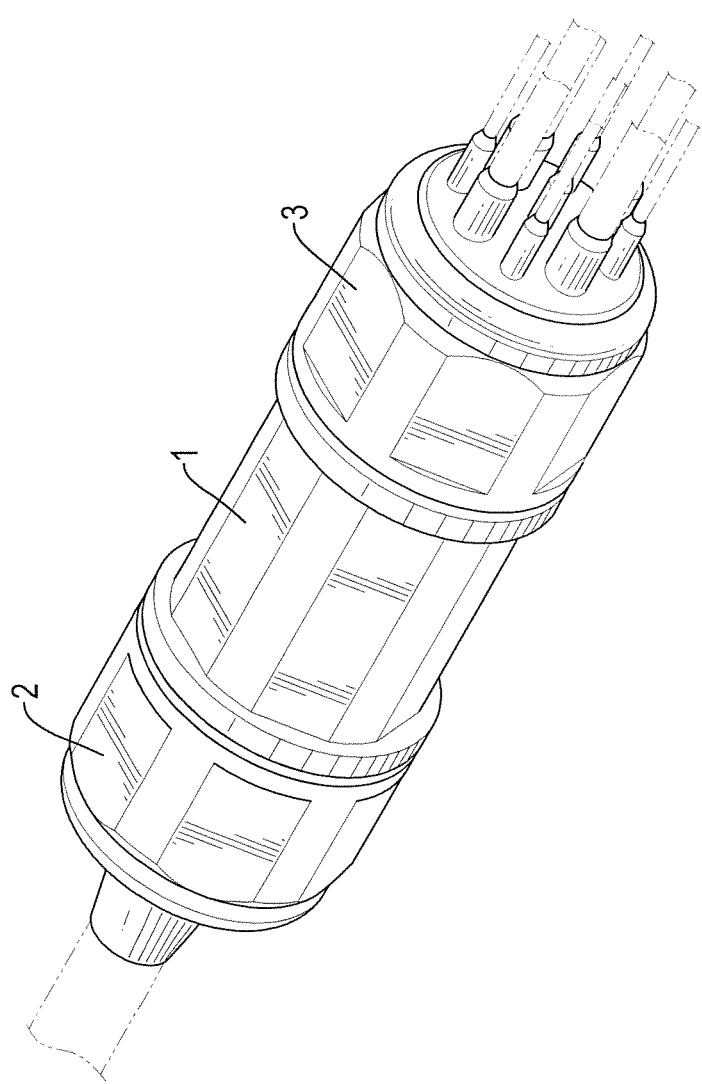
FIG. 1 is a perspective view of a water-proofing cable connector in accordance with the present invention.
Figure 2:
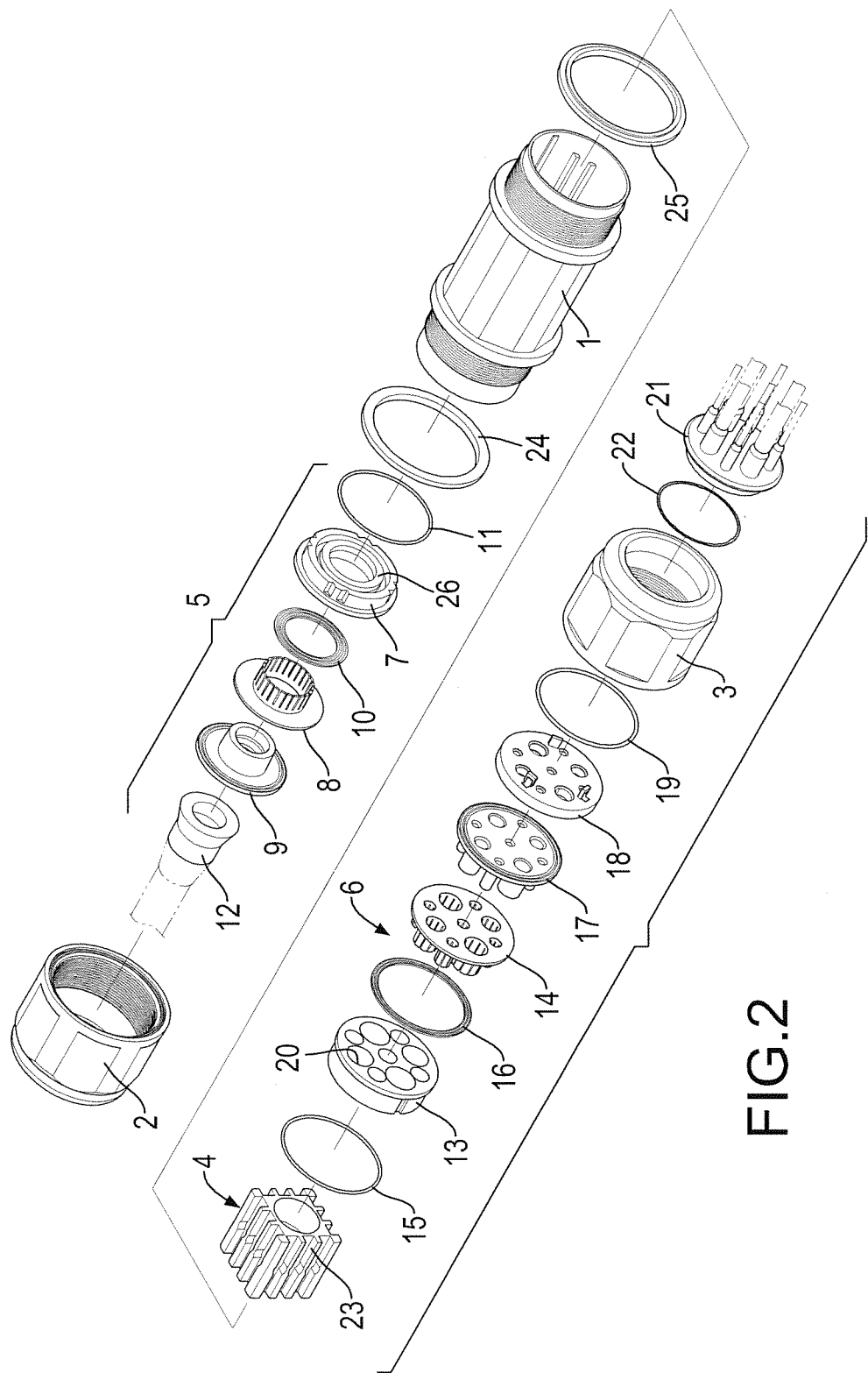
FIG. 2 is an exploded perspective view of the cable connector in FIG. 1.
Figure 3:
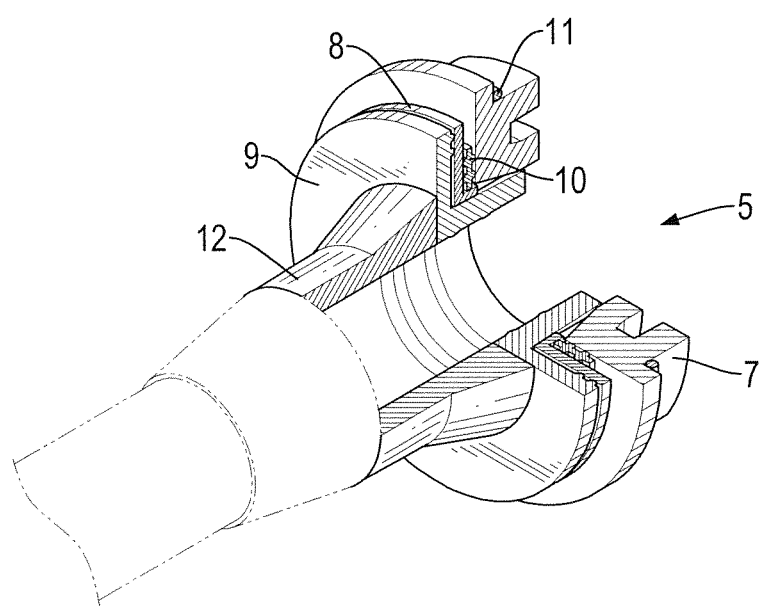
FIG. 3 is an enlarged perspective view of the cable sealing assembly of the cable connector in FIG. 2.
Figure 4:
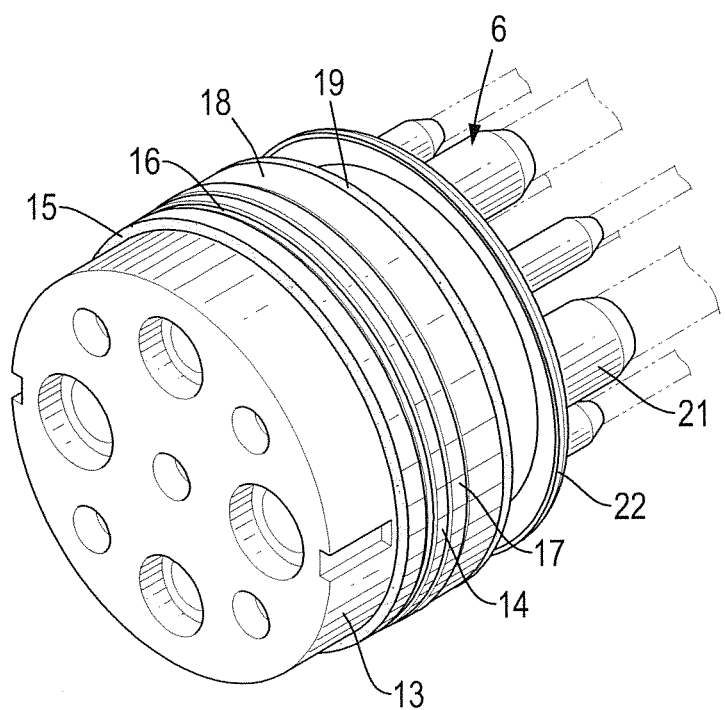
FIG. 4 is an enlarged perspective view of the wire sealing assembly of the cable connector in FIG. 2.
Figure 5:
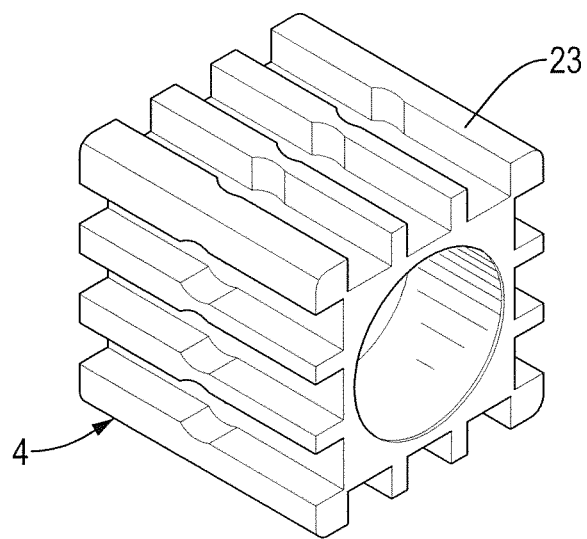
FIG. 5 is an enlarged perspective view of the wire separating base of the cable connector in FIG. 2.

With reference to FIGS. 1 to 5, a cable connector in accordance with the present invention comprises a housing 1, an input cap 2, an output cap 3, a wire separating base 4, a cable sealing assembly 5 and a wire sealing assembly 6. The housing 1 is hollow and has an input end and an output end. The input cap 2 is mounted on the input end of the housing 1. The output cap 3 is mounted on the output end of the housing 1 so as to define a sealed space between the housing 1, the input cap 2 and the output cap 3. The wire separating base 4, the cable sealing assembly 5 and the wire sealing assembly 6 are mounted in the sealed space between the housing 1, the input cap 2 and the output cap 3. A first sealing ring 24 is mounted around the input end of the housing 1, and a second sealing ring 25 is mounted around the output end of the housing 1. Accordingly, an excellent sealing and water-proofing effect is provided between the housing 1 and the caps 2,3.

The wire separating base 4 is mounted in the housing 1 and has a first end corresponding to the input end of the housing 1 and a second end corresponding to the output end of the housing 1. The wire separating base 4 has multiple wire grooves 23 defined longitudinally in an outer surface of the wire separating base 4. Through the wire grooves 23, branch wires separated from a cable are respectively mounted.

The cable sealing assembly 5 is connected securely with the inner wall of the housing 1, is connected to the first end of the wire separating base 4 and comprises a cable positioning base 7, a cable sealing base 8, a first sealing element 9, a second sealing element 10, a third sealing element 11 and a cable positioning sleeve 12. The cable positioning base 7 is connected securely with the inner wall of the housing 1, may be connected securely with the housing 1 by insert and socket assembly or fasteners and is connected with the first end of the wire separating base 4. The cable positioning base 7 has a cable input hole 26 defined through the cable positioning base 7. The cable sealing base 8 is mounted in the cable positioning base 7 and has a cable input hole defined through the cable sealing base 8 and co-axially corresponding to the cable input hole 26 of the cable positioning base 7. The first sealing element 9 is mounted in the cable sealing base 8 and has a cable input hole defined through the first sealing element 9 and co-axially corresponding to the cable input hole 26 of the cable positioning base 7. The second sealing element 10 is mounted around the cable sealing base 8. The third sealing element 11 is mounted around the cable positioning base 7. The cable positioning sleeve 12 is connected to the first sealing element 9 and is mounted through and extends out of the input cap 2.

The wire sealing assembly 6 is connected securely with the inner wall of the housing 1, is connected to the second end of the wire separating base 4 and comprises a wire positioning base 13, a wire sealing base 14, a first sealing member 15, a second sealing member 16, a third sealing member 17, a fourth sealing member 19, a pressing base 18, a wire positioning sleeve 21 and a fifth sealing member 22. The wire positioning base 13 is connected securely with the inner wall of the housing 1 and has multiple wire output holes 20 defined through the wire positioning base 13. The wire sealing base 14 is mounted in the wire positioning base 13 and has multiple wire output holes defined through the wire sealing base 14 and co-axially and respectively corresponding to the wire output holes 20 of the wire positioning base 13. The first sealing member 15 is mounted around the wire positioning base 13. The second sealing member 16 is mounted around the wire sealing base 14. The third sealing member 17 is mounted in the wire sealing base 14 and has multiple wire output holes defined through the third sealing member 17 and co-axially and respectively corresponding to the wire output holes 20 of the wire positioning base 13. The pressing base 18 is attached to the third sealing member 17 and has multiple wire output holes defined through the pressing base 18 and co-axially and respectively corresponding to the wire output holes 20 of the wire positioning base 13. The fourth sealing member 19 is mounted around the pressing base 18. The wire positioning sleeve 21 is connected to the pressing base 18 and is mounted through and extends out of the output cap 3. The fifth sealing member 22 is mounted around the wire positioning sleeve 21.

Accordingly, the cable sealing assembly 5 can provide an excellent sealing effect to the cable that is connected to the input end of the housing 1, and the wire sealing assembly 6 can provide an excellent sealing effect to the branch wires those are separated from the cable and extends out of the output end of the housing 1. Both the cable sealing assembly 5 and the wire sealing assembly 6 has multiple sealing elements/members, the cable connector in accordance with the present invention has an excellent water proofing effect. In addition, because the cable sealing assembly 5 and the wire sealing assembly 6 are mounted in the sealed space between the housing 1, the sealing assemblies 5, 6 are not exposed from the outer environment and are not easily damaged. Thus, the useful life of the cable connector can be efficiently prolonged.

The cable positioning sleeve 12 and the wire positioning sleeve 21 can respectively provide excellent positioning effect to the cable and the branch wires. In addition, the cable connector in accordance with the present invention is easily assembled with the cable and the branch wires.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector comprising:
   a hollow housing having an input end and an output end;
   an input cap mounted on the input end of the housing;
   an output cap mounted on the output end of the housing so as to define a sealed space between the housing, the input cap and the output cap;
   a wire separating base mounted in the housing and having a first end corresponding to the input end of the housing and a second end corresponding to the output end of the housing;
   a cable sealing assembly connected to the first end of the wire separating base; and
   a wire sealing assembly connected to the second end of the wire separating base, wherein the wire separating base, the cable sealing assembly and the wire sealing assembly are mounted in the sealed space between the housing, the input cap and the output cap;

2. The cable connector as claimed in claim 1, wherein the cable sealing assembly comprises
   a cable positioning base connected securely with the housing and having a cable input hole defined through the cable positioning base;
   a cable sealing base mounted in the cable positioning base and having a cable input hole defined through the cable sealing base and co-axially corresponding to the cable input hole of the cable positioning base;
   a first sealing element mounted in the cable sealing base and having a cable input hole defined through the first sealing element and co-axially corresponding to the cable input hole of the cable positioning base;
   a second sealing element mounted around the cable sealing base; and
   a third sealing element mounted around the cable positioning base.

3. The cable connector as claimed in claim 2, wherein a cable positioning sleeve is connected to the first sealing element and is mounted through and extends out of the input cap.

4. The cable connector as claimed in claim 3, wherein the wire sealing assembly comprises
   a wire positioning base connected securely with the housing and having multiple wire output holes defined through the wire positioning base;
   a wire sealing base mounted in the wire positioning base and having multiple wire output holes defined through the wire sealing base and co-axially and respectively corresponding to the wire output holes of the wire positioning base;
   a first sealing member mounted around the wire positioning base;
   a second sealing member mounted around the wire sealing base; and
   a third sealing member mounted in the wire sealing base and having multiple wire output holes defined through the third sealing member and co-axially and respectively corresponding to the wire output holes of the wire positioning base;
   a pressing base attached to the third sealing member and having multiple wire output holes defined through the pressing base and co-axially and respectively corresponding to the wire output holes of the wire positioning base; and
   a fourth sealing member mounted around the pressing base.

5. The cable connector as claimed in claim 4, wherein a wire positioning sleeve is connected to the pressing base and is mounted through and extends out of the output cap; and
   a fifth sealing member is mounted around the wire positioning sleeve.

6. The cable connector as claimed in claim 5, wherein the wire separating base has multiple wire grooves defined longitudinally in an outer surface of the wire separating base.

7. The cable connector as claimed in claim 6, wherein the housing further has
   a first sealing ring mounted around the input end of the housing; and
   a second sealing ring mounted around the output end of the housing.

8. The cable connector as claimed in claim 1, wherein the wire sealing assembly comprises
   a wire positioning base connected securely with the housing and having multiple wire output holes defined through the wire positioning base;
   a wire sealing base mounted in the wire positioning base and having multiple wire output holes defined through the wire sealing base and co-axially and respectively corresponding to the wire output holes of the wire positioning base;

a first sealing member mounted around the wire positioning base;

a second sealing member mounted around the wire sealing base; and a third sealing member mounted in the wire sealing base and having multiple wire output holes defined through the third sealing member and co-axially and respectively corresponding to the wire output holes of the wire positioning base;

a pressing base attached to the third sealing member and having multiple wire output holes defined through the pressing base and co-axially and respectively corresponding to the wire output holes of the wire positioning base; and a fourth sealing member mounted around the pressing base.

9. The cable connector as claimed in claim 8, wherein a wire positioning sleeve is connected to the pressing base and is mounted through and extends out of the output cap; and a fifth sealing member is mounted around the wire positioning sleeve.

10. The cable connector as claimed in claim 1, wherein the wire separating base has multiple wire grooves defined longitudinally in an outer surface of the wire separating base.

11. The cable connector as claimed in claim 1, wherein the housing further has a first sealing ring mounted around the input end of the housing; and a second sealing ring mounted around the output end of the housing.

* * * * *